(12) United States Patent
Alarcon et al.

(10) Patent No.: US 12,543,801 B2
(45) Date of Patent: Feb. 10, 2026

(54) ELECTRONIC CIGARETTE

(71) Applicant: FONTEM VENTURES B.V., Amsterdam (NL)

(72) Inventors: Ramon Alarcon, Los Gatos, CA (US); Dennis Rasmussen, Campbell, CA (US); Hitesh Bagai, Bristol (GB); Andreas Ingo Beer, Grasbrunn (DE)

(73) Assignee: FONTEM VENTURES B.V., Amsterdam (NL)

( * ) Notice: Subject to any disclaimer, the term of this patent is extended or adjusted under 35 U.S.C. 154(b) by 231 days.

(21) Appl. No.: 17/745,558

(22) Filed: May 16, 2022

(65) Prior Publication Data

US 2022/0273047 A1 Sep. 1, 2022

Related U.S. Application Data

(63) Continuation of application No. 16/124,907, filed on Sep. 7, 2018, now abandoned.

(51) Int. Cl.
*A24F 40/95* (2020.01)
*A24F 21/00* (2006.01)
*H02J 7/00* (2006.01)

(52) U.S. Cl.
CPC .............. *A24F 40/95* (2020.01); *A24F 21/00* (2013.01); *H02J 7/0044* (2013.01)

(58) Field of Classification Search
None
See application file for complete search history.

(56) References Cited

U.S. PATENT DOCUMENTS

| | | | |
|---|---|---|---|
| 9,985,455 B2 | 5/2018 | Alarcon et al. | |
| 10,051,893 B2 | 8/2018 | Hoffman et al. | |
| 10,098,383 B2 | 10/2018 | Alarcon et al. | |
| 2013/0169230 A1 | 7/2013 | Li et al. | |
| 2014/0014125 A1 | 1/2014 | Fernando et al. | |
| 2014/0076310 A1* | 3/2014 | Newton | A61M 15/06 128/202.21 |
| 2015/0020831 A1* | 1/2015 | Weigensberg | A24F 40/90 131/329 |
| 2015/0020832 A1 | 1/2015 | Greim et al. | |
| 2015/0328415 A1 | 11/2015 | Minskoff et al. | |
| 2015/0333542 A1 | 11/2015 | Alarcon et al. | |
| 2016/0150824 A1* | 6/2016 | Memari | A24F 40/95 131/329 |
| 2016/0204637 A1 | 7/2016 | Alarcon et al. | |
| 2016/0345628 A1 | 12/2016 | Sabet | |

(Continued)

FOREIGN PATENT DOCUMENTS

| | | |
|---|---|---|
| EP | 3292771 A1 | 3/2018 |
| KR | 101232619 B1 | 2/2013 |
| WO | 2017130173 A1 | 8/2017 |

OTHER PUBLICATIONS

ISA/EP, "International Search Report and Written Opinion", for Application No. PCT/IB2019/057503; Mail Date: Dec. 12, 2019; 10 pages.

*Primary Examiner* — Katherine A Will
(74) *Attorney, Agent, or Firm* — Perkins Coie LLP; Kenneth H. Ohriner

(57) ABSTRACT

One or more features of an electronic cigarette or an electronic cigarette charging case is configured to hold the electronic cigarette in place and inhibit it from rolling and charge the electronic cigarette.

9 Claims, 7 Drawing Sheets

(56) References Cited

U.S. PATENT DOCUMENTS

| | | |
|---|---|---|
| 2018/0020727 A1 | 1/2018 | Hoffman et al. |
| 2018/0296779 A1* | 10/2018 | Takeuchi ............. A61M 11/042 |
| 2019/0380390 A1 | 12/2019 | Jeong et al. |
| 2020/0154776 A1 | 5/2020 | Lee et al. |
| 2021/0127757 A1 | 5/2021 | Lee et al. |

* cited by examiner

ELECTRONIC CIGARETTE

CROSS-REFERENCE TO RELATED APPLICATIONS

This Application is a continuation of U.S. patent application Ser. No. 16/124,907 filed Sep. 7, 2018 and now abandoned and incorporated herein by reference.

FIELD OF THE DISCLOSURE

The present disclosure relates to a system, a method, and a device for inhibiting a round electronic cigarette from rolling away when placed on a charging case.

BACKGROUND OF THE DISCLOSURE

Electronic cigarettes, also known as e-cigarettes (eCigs) and personal vaporizers (PVs), are a popular alternative to traditional tobacco-based cigarettes that must be burned in order to generate smoke for inhalation. Electronic cigarettes provide an aerosol for inhalation, but do not contain certain byproducts of combustion that may be harmful to human health. Electronic cigarettes are electronic inhalers that vaporize or atomize a liquid solution (smoke juice) into an aerosol mist that may then be delivered to a user. A typical eCig has two main parts—a battery and a cartomizer—contained within a cylindrical metal housing.

BRIEF SUMMARY

In accordance with one aspect of the present invention there is provided an anti-roll system comprising an electronic smoking device, and at least one anti-roll feature configured to inhibit the electronic smoking device from rolling away from the charging case and configured to charge or hold the electronic smoking device, wherein the charging case comprises a plurality of connectors configured to electrically couple the electronic smoking device and the charging case and.

In accordance with another aspect of the present invention there is provided an anti-roll system can comprise an electronic smoking device, and a charging stand configured to charge or hold the electronic smoking device, wherein the charging stand comprises a plurality of connectors configured to electrically couple with the electronic smoking device, at least one anti-roll feature configured to inhibit the electronic smoking device from rolling away from the charging stand, and a connector, where the connector electrically couples the plurality of connectors with external circuitry.

In accordance with yet another aspect of the present invention there is provided a charging case for an electronic smoking device comprises an anti-roll feature, wherein the anti-roll feature is located on an exterior surface of the charging case body and is configured to inhibit the electronic smoking device from rolling away from the charging case, a plurality of connectors configured to electrically couple the electronic smoking device and the charging case when the electronic smoking device is engaged with the anti-roll feature.

Additional features, advantages, and embodiments of the disclosure may be set forth or apparent from consideration of the following detailed description, drawings, and claims. Moreover, it is to be understood that both the foregoing summary of the disclosure and the following detailed description are exemplary and intended to provide further explanation without limiting the scope of the disclosure as claimed.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and the various ways in which it may be practiced. In the drawings.

DETAILED DESCRIPTION OF THE DISCLOSURE

Figure 1:
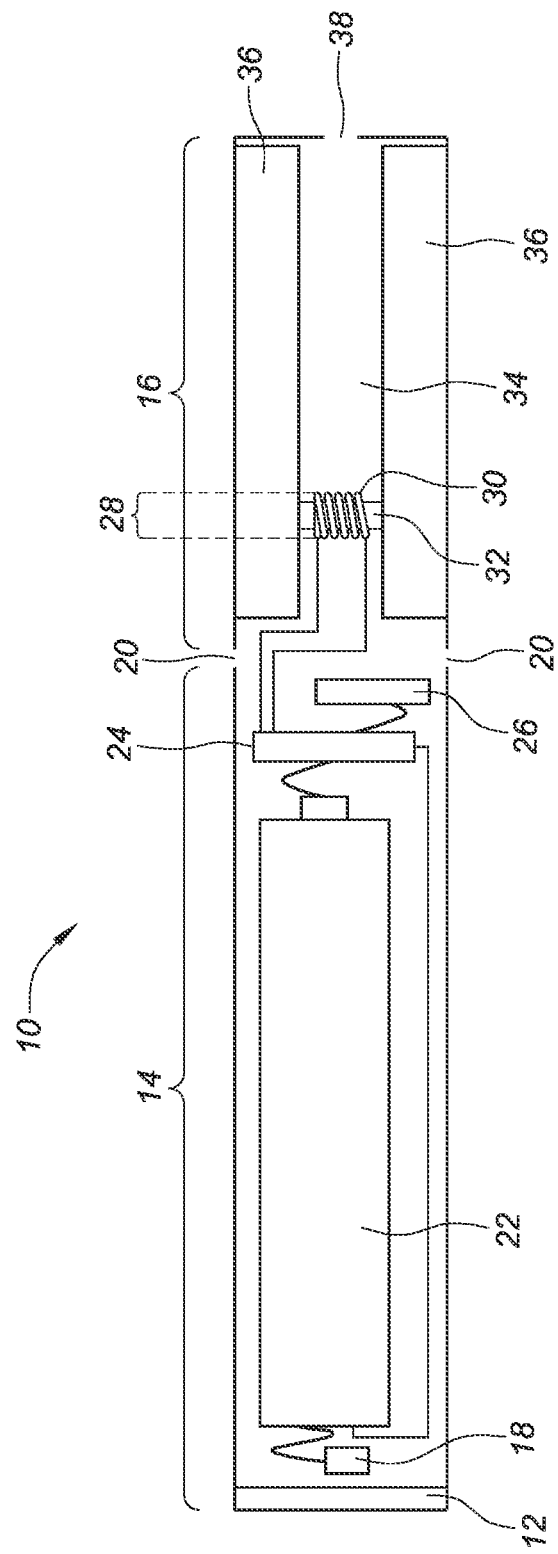
FIG. 1 is a schematic cross-sectional illustration of an exemplary e-cigarette FIGS. 2A and B are perspective views showing examples of charging cases that are constructed according to an aspect of the disclosure.

The disclosure and the various features and advantageous details thereof are explained more fully with reference to the non-limiting embodiments and examples that are described and/or illustrated in the accompanying drawings and detailed in the following. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Throughout the following, an electronic smoking device will be exemplarily described with reference to an e-cigarette. As is shown in FIG. 1, an e-cigarette (or eCig) 10 typically has a housing comprising a cylindrical hollow tube having an end cap 12. The cylindrical hollow tube may be a single-piece or a multiple-piece tube. In FIG. 1, the cylindrical hollow tube is shown as a two-piece structure having a power supply portion 14 and an atomizer/liquid reservoir portion 16. Together the power supply portion 14 and the atomizer/liquid reservoir portion 16 form a cylindrical tube which can be approximately the same size and shape as a conventional cigarette, typically about 100 mm with a 7.5 mm diameter, although lengths may range from 70 to 150 or 180 mm, and diameters from 5 to 28 mm.

The power supply portion 14 and atomizer/liquid reservoir portion 16 are typically made of metal (e.g., steel or aluminum, or of hardwearing plastic) and act together with the end cap 12 to provide a housing to contain the components of the e-cigarette 10. The power supply portion 14 and the atomizer/liquid reservoir portion 16 may be configured to fit together by, for example, a friction push fit, a snap fit, a bayonet attachment, a magnetic fit, or screw threads. The end cap 12 is provided at the front end of the power supply portion 14. The end cap 12 may be made from translucent plastic or other translucent material to allow a light-emitting diode (LED) 18 positioned near the end cap to emit light through the end cap. Alternatively, the end cap may be made of metal or other materials that do not allow light to pass.

An air inlet may be provided in the end cap, at the edge of the inlet next to the cylindrical hollow tube, anywhere along the length of the cylindrical hollow tube, or at the connection of the power supply portion 14 and the atomizer/liquid reservoir portion 16. FIG. 1 shows a pair of air inlets 20 provided at the intersection between the power supply portion 14 and the atomizer/liquid reservoir portion 16.

A power supply, preferably a battery 22, the LED 18, control electronics 24 and, optionally, an airflow sensor 26 are provided within the cylindrical hollow tube power supply portion 14. The battery 22 is electrically connected to the control electronics 24, which are electrically connected to the LED 18 and the airflow sensor 26. In this example, the LED 18 is at the front end of the power supply portion 14, adjacent to the end cap 12; and the control electronics 24 and airflow sensor 26 are provided in the central cavity at the other end of the battery 22 adjacent the atomizer/liquid reservoir portion 16.

The airflow sensor 26 acts as a puff detector, detecting a user puffing or sucking on the atomizer/liquid reservoir portion 16 of the e-cigarette 10. The airflow sensor 26 can be any suitable sensor for detecting changes in airflow or air pressure, such as a microphone switch including a deformable membrane which is caused to move by variations in air pressure. Alternatively, the sensor may be, for example, a Hall element or an electro-mechanical sensor.

The control electronics 24 are also connected to an atomizer 28. In the example shown, the atomizer 28 includes a heating coil 30 which is wrapped around a wick 32 extending across a central passage 34 of the atomizer/liquid reservoir portion 16. The central passage 34 may, for example, be defined by one or more walls of the liquid reservoir and/or one or more walls of the atomizer/liquid reservoir portion 16 of the e cigarette 10. The coil 30 may be positioned anywhere in the atomizer 28 and may be transverse or parallel to a longitudinal axis of a cylindrical liquid reservoir 36. The wick 32 and heating coil 30 do not completely block the central passage 34. Rather an air gap is provided on either side of the heating coil 30 enabling air to flow past the heating coil 30 and the wick 32. The atomizer may alternatively use other forms of heating elements, such as ceramic heaters, or fiber or mesh material heaters. Nonresistance heating elements such as sonic, piezo, and jet spray may also be used in the atomizer in place of the heating coil.

The central passage 34 is surrounded by the cylindrical liquid reservoir 36 with the ends of the wick 32 abutting or extending into the liquid reservoir 36. The wick 32 may be a porous material such as a bundle of fiberglass fibers or cotton or bamboo yarn, with liquid in the liquid reservoir 36 drawn by capillary action from the ends of the wick 32 towards the central portion of the wick 32 encircled by the heating coil 30.

The liquid reservoir 36 may alternatively include wadding (not shown in FIG. 1) soaked in liquid which encircles the central passage 34 with the ends of the wick 32 abutting the wadding. In other embodiments, the liquid reservoir may comprise a toroidal cavity arranged to be filled with liquid and with the ends of the wick 32 extending into the toroidal cavity.

An air inhalation port 38 is provided at the back end of the atomizer/liquid reservoir portion 16 remote from the end cap 12. The inhalation port 38 may be formed from the cylindrical hollow tube atomizer/liquid reservoir portion 16 or may be formed in an end cap.

Figure 2A:
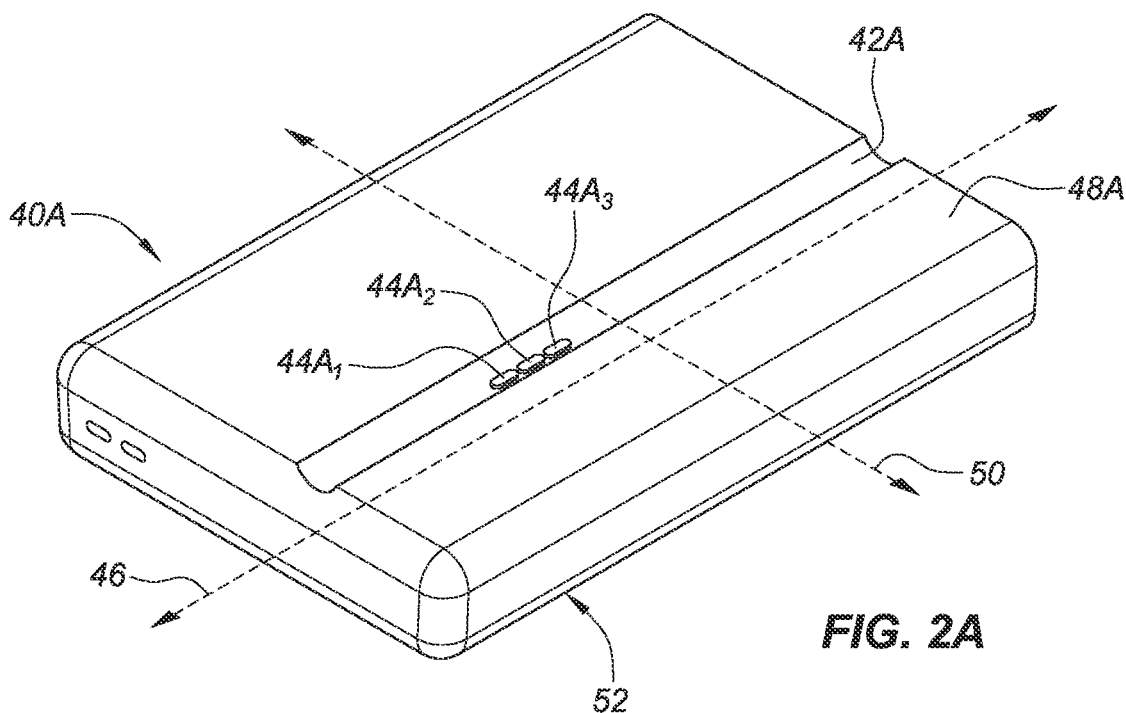
FIG. 2C is a cross-sectional side view of an e-cigarette, consistent with various aspects of the present disclosure.
Figure 2B:
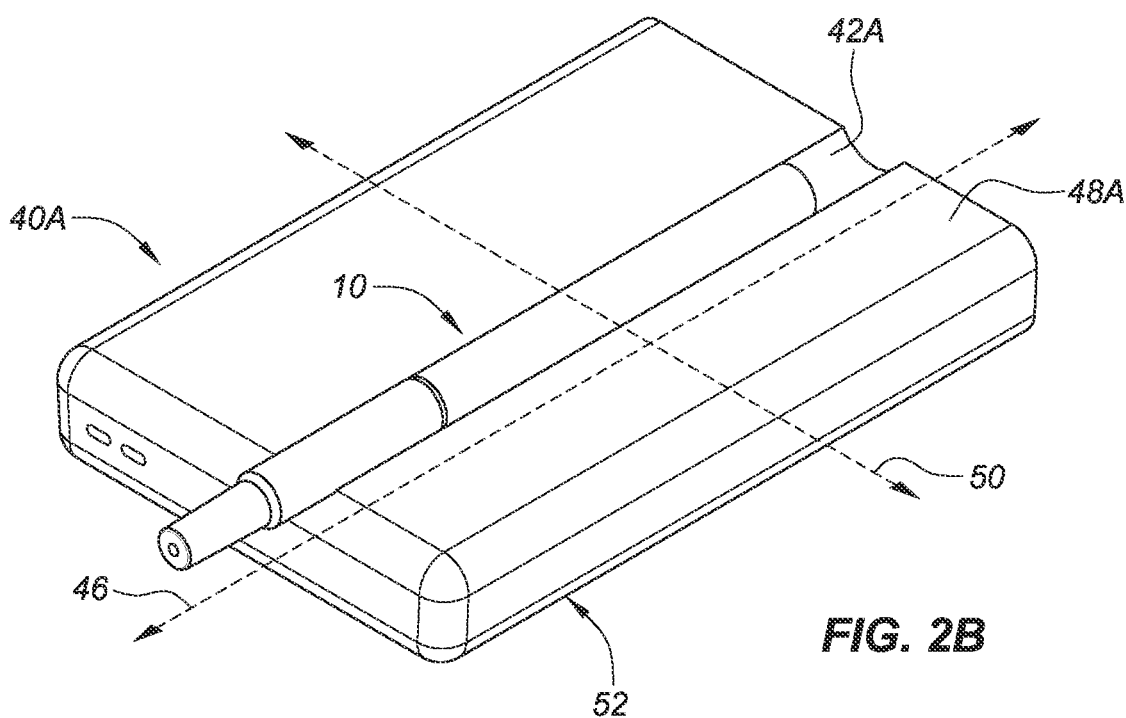
Figure 2C:
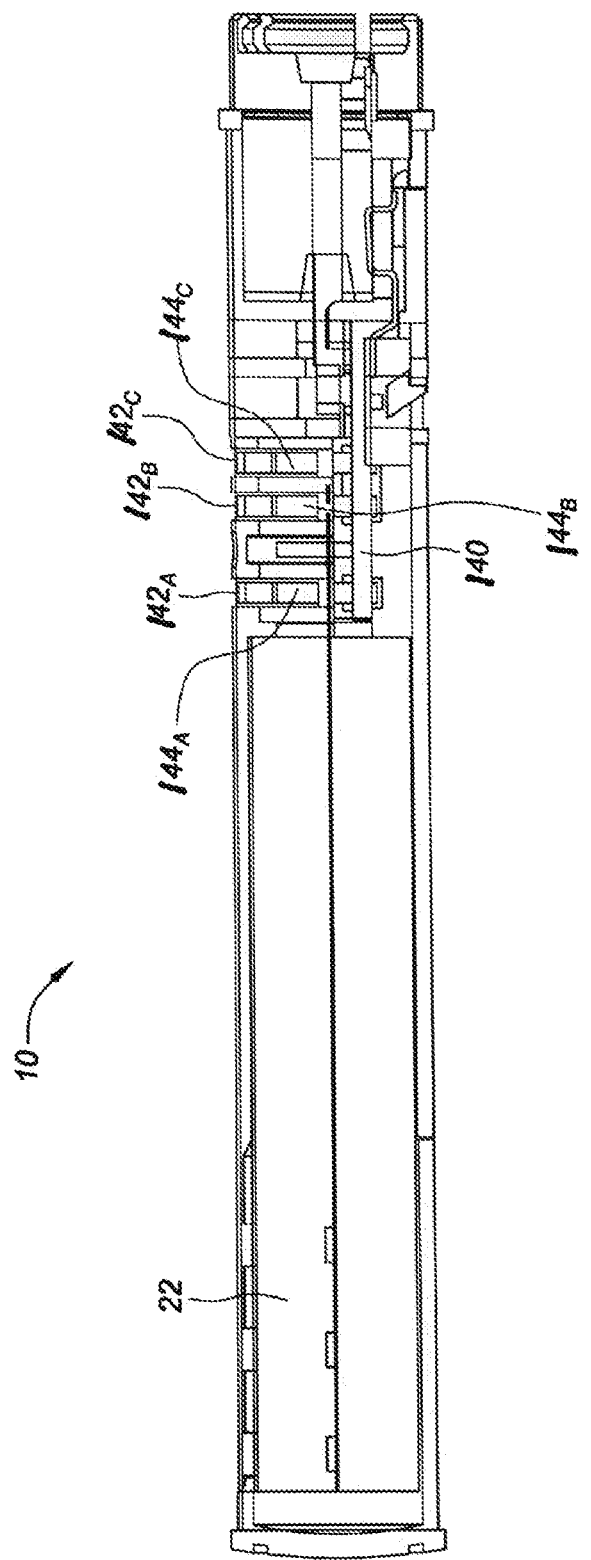

As shown in FIG. 2C, the e-cigarette 10 can include a battery 22 and controller circuitry 24. Electrical contact apertures 142 A-C can be located on the e-cigarette 10. Electrical contacts or connectors 144 A-C can be electrically coupled with the controller circuitry 24, and extend through at least a portion of the electrical contact apertures 142 A-C. The electrical connectors 144 A-C facilitate electrical communication between the controller circuitry 24 and external circuitry, as well as charging of the battery 22 by transmitting a current to the battery 22 from an external power source (e.g., external battery, charger, electronic device, among others).

In use, a user sucks on the e-cigarette 10. This causes air to be drawn into the e cigarette 10 via one or more air inlets, such as air inlets 20, and to be drawn through the central passage 34 towards the air inhalation port 38. The change in air pressure which arises is detected by the airflow sensor 26, which generates an electrical signal that is passed to the control electronics 24. In response to the signal, the control electronics 24 activate the heating coil 30, which causes liquid present in the wick 32 to be vaporized creating an aerosol (which may comprise gaseous and liquid components) within the central passage 34. As the user continues to suck on the e-cigarette 10, this aerosol is drawn through the central passage 34 and inhaled by the user. At the same time, the control electronics 24 also activate the LED 18 causing the LED 18 to light up, which is visible via the translucent end cap 12. Activation of the LED may mimic the appearance of a glowing ember at the end of a conventional cigarette. As liquid present in the wick 32 is converted into an aerosol, more liquid is drawn into the wick 32 from the liquid reservoir 36 by capillary action and thus is available to be converted into an aerosol through subsequent activation of the heating coil 30.

Some e-cigarette are intended to be disposable and the electric power in the battery 22 is intended to be sufficient to vaporize the liquid contained within the liquid reservoir 36, after which the e-cigarette 10 is thrown away. In other embodiments, the battery 22 is rechargeable and the liquid reservoir 36 is refillable. In the cases where the liquid reservoir 36 is a toroidal cavity, this may be achieved by refilling the liquid reservoir 36 via a refill port (not shown in FIG. 1). In other embodiments, the atomizer/liquid reservoir portion 16 of the e cigarette 10 is detachable from the power supply portion 14 and a new atomizer/liquid reservoir portion 16 can be fitted with a new liquid reservoir 36 thereby replenishing the supply of liquid. In some cases, replacing the liquid reservoir 36 may involve replacement of the heating coil 30 and the wick 32 along with the replacement of the liquid reservoir 36. A replaceable unit comprising the atomizer 28 and the liquid reservoir 36 may be referred to as a cartomizer.

The new liquid reservoir may be in the form of a cartridge (not shown in FIG. 1) defining a passage (or multiple passages) through which a user inhales aerosol. In other embodiments, the aerosol may flow around the exterior of the cartridge to the air inhalation port 38.

Of course, in addition to the above description of the structure and function of a typical e cigarette 10, variations also exist. For example, the LED 18 may be omitted. The airflow sensor 26 may be placed, for example, adjacent to the end cap 12 rather than in the middle of the e-cigarette. The airflow sensor 26 may be replaced by, or supplemented with, a switch which enables a user to activate the e cigarette manually rather than in response to the detection of a change in airflow or air pressure.

Different types of atomizers may be used. Thus, for example, the atomizer may have a heating coil in a cavity in the interior of a porous body soaked in liquid. In this design, aerosol is generated by evaporating the liquid within the porous body either by activation of the coil heating the porous body or alternatively by the heated air passing over or through the porous body. Alternatively the atomizer may use a piezoelectric atomizer to create an aerosol either in combination or in the absence of a heater FIGS. 2A-B illustrate examples of a charging case 40A with one type of anti-roll feature configured to hold the eCig and inhibit it from rolling away and connectors configured to charge the eCig and/or communicate with external circuitry. The charging case 40A can include a groove 42A that is configured to hold the eCig 10 and inhibit it from rolling away. The groove 42A can also include connectors (e.g., "electrical connectors," "electrical contacts" or "plurality of connectors") 44A.sub.1-3.

The groove 42A shown in FIG. 2A is parallel to a longitudinal axis 46 of the charging case 40A. The groove 42A can be centered or off-center from the longitudinal axis 46, and it can be located on either a posterior surface 48A or an anterior surface (not shown) of the charging case 40A.

FIG. 2B shows the eCig 10 coupled with the groove 42A of the charging case 40A. The eCig 10 can include electrical contacts (not shown) that can electrically couple with the connectors 44A.sub.1-3 of the charging case 40A (hidden from view in FIG. 2B). The electrical coupling of the eCig 10 and the charging case 40A can, for example, facilitate charging of the battery 22 and/or electrical communication between the eCig 10 and external circuitry (not shown).

The groove 42A can also be angled rather than aligned with an axis or edge of the charging case 40A. The groove 42A can be configured to cover a specified portion of the eCig surface area (e.g., 20%, 25%, 40%, 50%, 60%, 75%, 80%).

The connectors 44A.sub.1-3 can be electrically coupled with the control electronics 24 of the eCig 10 (see FIG. 1). As discussed in more detail below, the connectors 44A.sub.1-3 can facilitate electrical communication between the control electronics 24 and external circuitry, as well as charging of the battery 22 by transmitting a current to the battery 22 from an external power source (e.g., external battery, charger, electronic device, among others).

The eCig 10 can utilize software, hardware, firmware, and/or logic to perform a number of functions described herein. The eCig 10 can include a combination of hardware and instructions to share information. The hardware, for example can include the control electronics 24 and/or a memory (not shown) (e.g., non-transitory computer-readable medium (CRM) database, etc.). The memory, as used herein, can include a number of processors capable of executing instructions stored by the memory resource. The memory can be integrated in a single device or distributed across multiple devices. The instructions (e.g., computer-readable instructions) can include instructions stored on the memory and executable by the memory for providing control over the eCig 10 and/or performing various steps discussed in relation to FIGS. 5A-B, in an example.

The charging case 40A can include a charging case body 52. A portion of the charging case body 52A can be configured to open to allow storage of the eCig 10 in the charging case 40A. In some embodiments, a portion of the posterior surface 48A can be connected to the case body 52A by a hinge (not shown). The hinge can allow the portion of the posterior surface 48A or the anterior surface to move to allow the charging case 40A to receive the eCig 10.

Figure 3A:
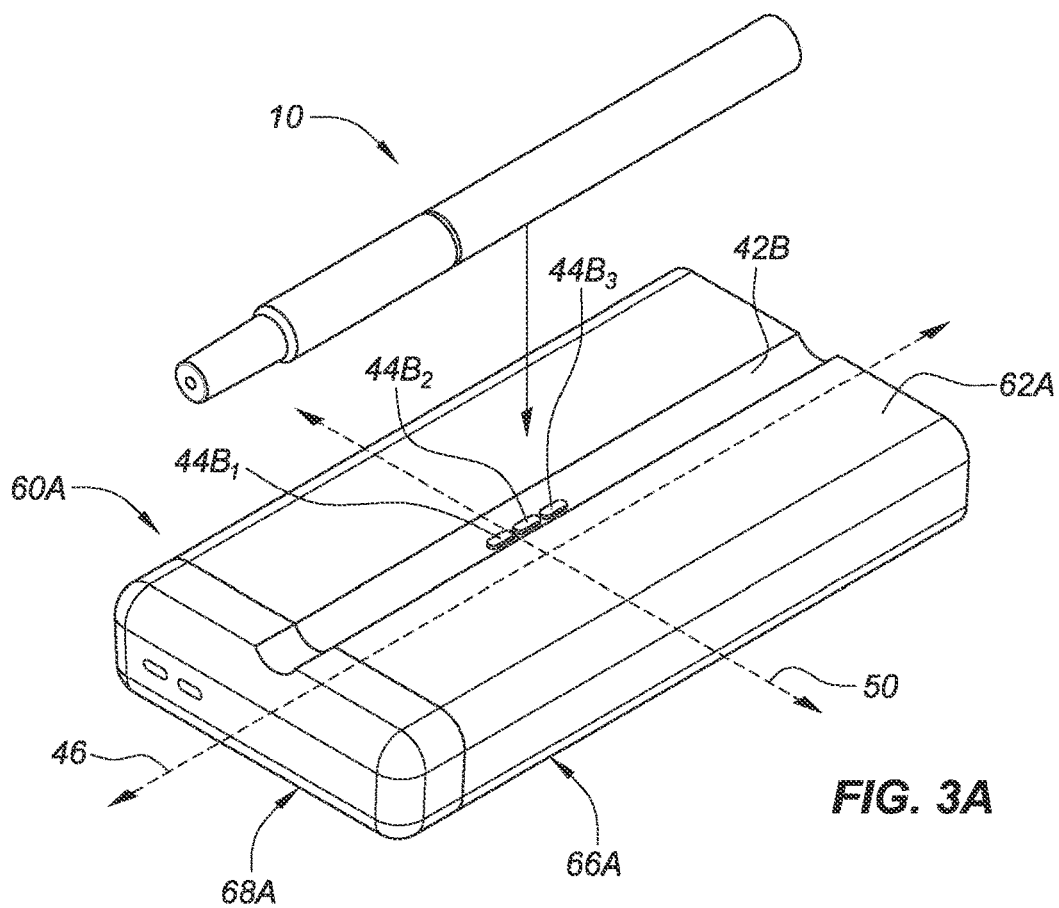
FIGS. 3A-3C are perspective views showing examples of charging cases with anti-roll features that are constructed according to an aspect of the disclosure.
Figure 3B:
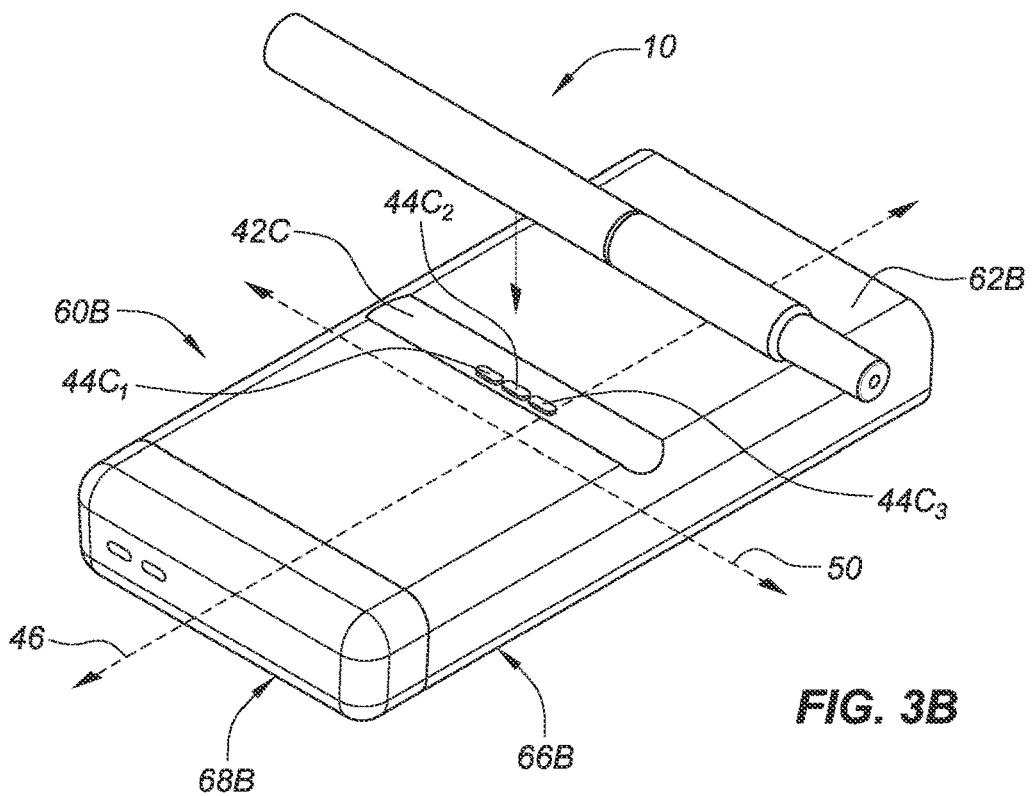
Figure 3C:
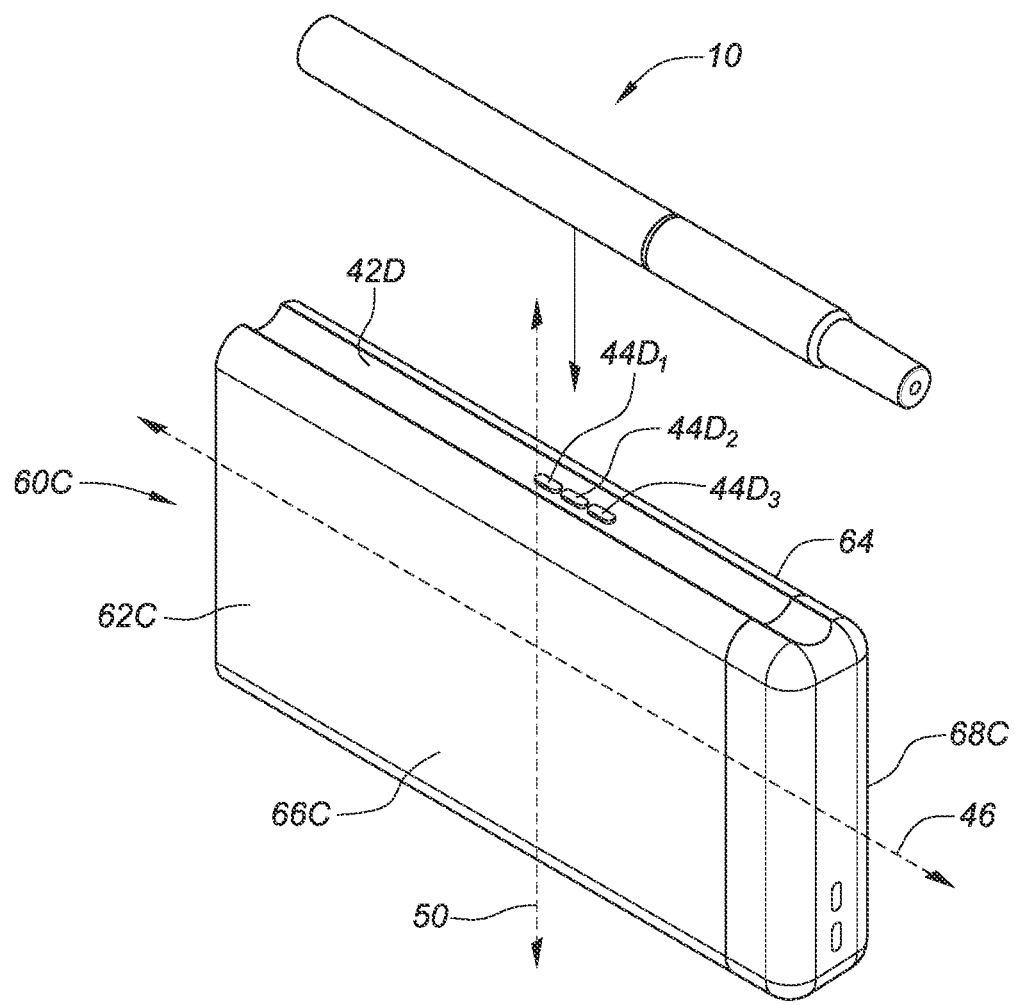

FIGS. 3A-3C illustrate examples of charging cases 60A, 60B, and 60C with a groove 42B, 42C and 42D in the corresponding charging case that is configured to hold the eCig 10 and inhibit it from rolling away. The grooves 42B, 42C, and 42D of the charging cases 60A, 60B, and 60C, respectively, can also include connectors (e.g., "electrical connectors," "electrical contacts" or "plurality of connectors") 44B.sub.1-3, 44C.sub.1-3, and 44D.sub.1-3 in each corresponding groove. The connectors 44B.sub.1-3, 44C.sub.1-3, and 44D.sub.1-3 can facilitate electrical communication between the control electronics 24 (see FIG. 1) and external circuitry, as well as charging of the battery 22 by transmitting a current to the battery 22 (see FIG. 1) from an external power source (e.g., external battery, charger, electronic device, among others).

The groove 42B shown in FIG. 3A is parallel to a longitudinal axis 46 of the pack 60A. The groove 42B can be centered or off-center from the longitudinal axis 46, and it can be located on either a posterior surface 62A or an anterior surface (not shown) of the pack 60A. The groove 42C shown in FIG. 3B is perpendicular to the longitudinal axis 46 and parallel to a transverse axis 50 of the pack 60B. The groove 42C can be centered or off-center from the transverse axis 50, and it can be located on either a posterior surface 62B or an anterior surface (not shown) of the charging case 60B. Finally, the groove 42D shown in FIG. 3C is located on a right side 64 of the pack 60C. The groove 42D can also be located on the left side (not shown) of the pack 60C. The groove 42D can be parallel to the longitudinal axis 46 of the pack 60C.

The charging cases 60A, 60B, 60C can each further comprise a corresponding charging case body 66A, 66B, 66C and a charging case lid 68A, 68B, 68C. The charging case lids 68A, 68B, 68C can be configured to open to allow storage of the eCig 10 in each respective charging case 60A, 60B, 60C. The charging case lid 68A, 68B, 68C can be connected to each respective case body 66A, 66B, 66C by a hinge (see FIG. 4 and related discussion for additional information). The hinge can allow the charging case lid 68A, 68B, 68C to move (e.g., pivot/rotate open) to allow the charging case 60A, 60B, 60C to receive the eCig 10.

The grooves 42B, 42C, 42D can also be angled rather than aligned with an axis or edge of the pack. The grooves 42B, 42C, 42D can be configured to cover a specified portion of the eCig surface area (e.g., 20%, 25%, 40%, 50%, 60%, 75%, 80%).

Figure 4:
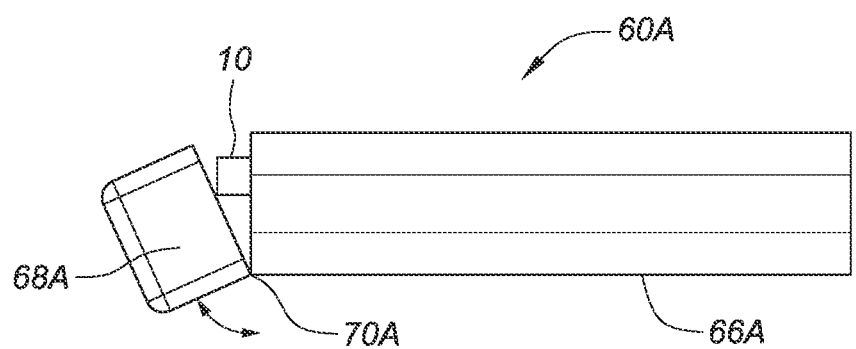
FIG. 4 is a side view of the charging case of FIG. 3A.

FIG. 4 is a side view of the charging case 60A of FIG. 3A. As described above, the charging case 60A can include the charging case body 66A, the charging case lid 68A, and a hinge 70A. The hinge 70A allows the charging case lid 68A to be rotatably coupled with the charging case body 66A. The charging case 60A can comprise a plurality of regions, each of which is configured to receive a respective eCig 10, or a component of the eCig 10 (e.g., a power supply portion 14, a liquid reservoir portion 16, etc.) When the charging case lid 68A is opened (e.g., rotated about the hinge to allow access to an interior of the charging case 60A) the eCig 10 can be placed inside one of the plurality of regions of the charging case 60A. In other embodiments, the hinge can be located on the right side 64 of the charging case body 66A or the left side (not shown).

Figure 5A:
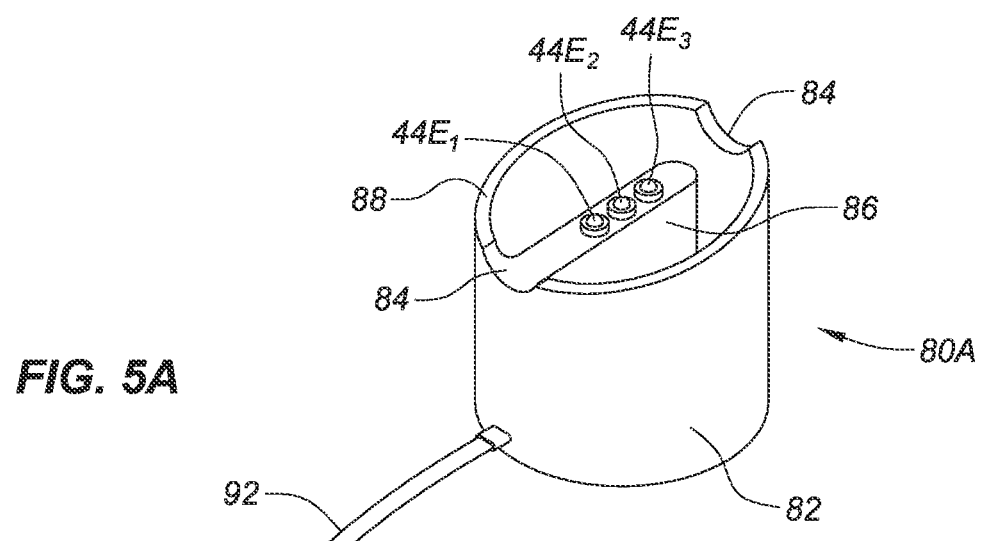
FIGS. 5A and 5B are perspective views showing examples of a charging stand with anti-roll features that is constructed according to an aspect of the disclosure.

FIG. 5A is a perspective view of a charging stand 80A with groove portions 84 configured to hold the eCig 10 and inhibit it from rolling away (similar to grooves 42A-D described above). The charging stand 80A can comprise a charging stand body 82, groove portion 84, and a support portion 86. The charging stand 80A can be configured such that an anterior surface (hidden in FIG. 5A) can rest on another surface (e.g., a table, a counter, a desk, etc.).

The support portion 86 can include connectors 44E.sub.1-3 that can facilitate electrical communication between the control electronics 24 and external circuitry, as well as charging of the battery 22 by transmitting a current to the battery 22 from an external power source (e.g., external battery, charger, electronic device, among others).

The groove portion 84 can be in multiple locations along an edge portion 88 with the support portion 86 as shown in FIG. 5A, or the groove portion 84 can be a continuous groove similar to the groove 42A-D in FIGS. 2A-B and 3A-C. As shown in FIG. 5A, the groove portions 84 can be in the edge portion 88 of the charging stand 80. The groove portions 84 in charging stand 80A can be integrally molded and can extend as deep as the diameter of eCig 10, or any percentage thereof (90%, 80%, 70%, 60%, 50%, 40%, 30%, 20%, 10%, etc.). In some embodiments, the grove portion 84 can be deeper than the diameter of the eCig 10.

The charging stand body 82 can be any suitable shape (e.g., round, oval, square, triangular, etc.) The charging stand body 82 can also be electrically coupled with a connector 90. The connector 90 can be coupled with the charging stand body 82 by, for example, a wire 92. The connector 90 can be connected to external circuitry, such as a computer (though a Universal Serial Bus (USB) connection), a wall outlet, another battery, etc.

Figure 5B:
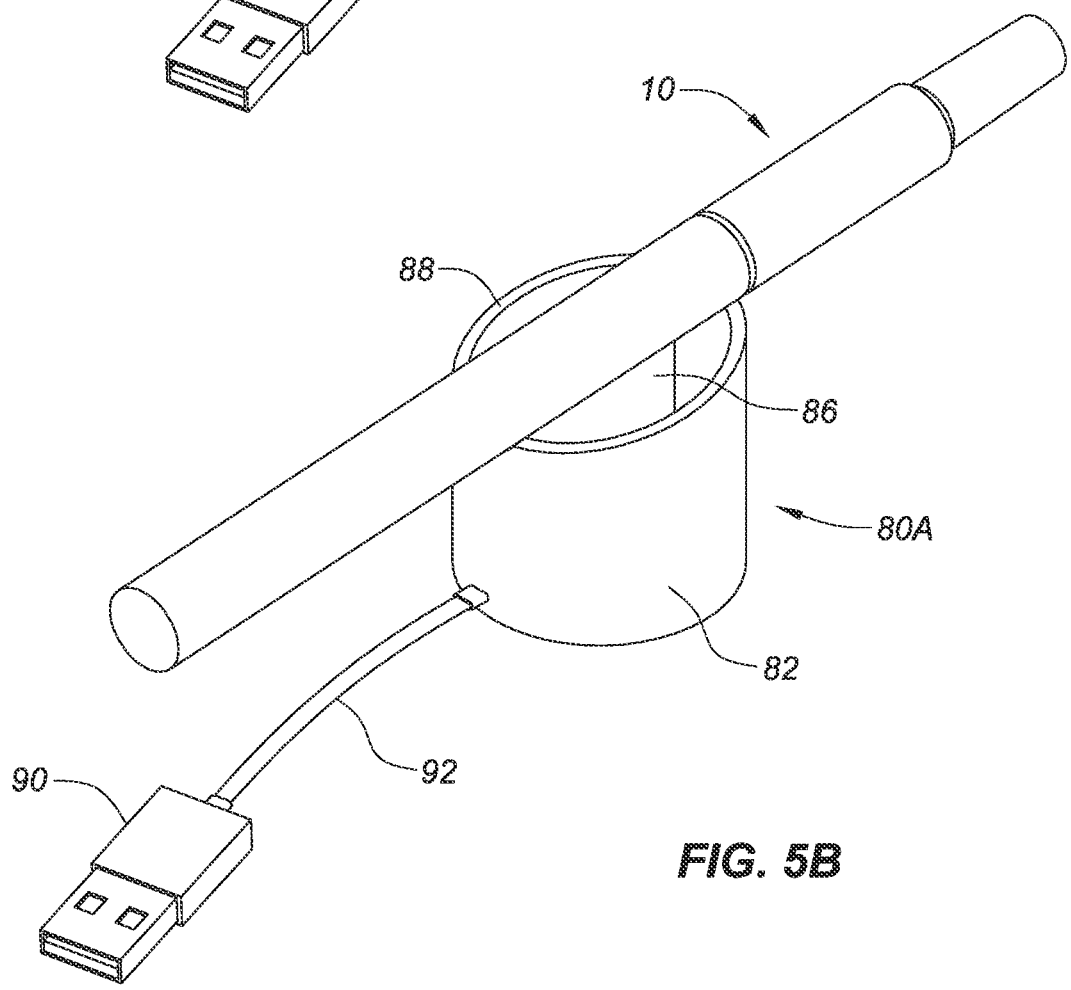

FIG. 5B is a perspective view of an eCig coupled with the charging stand of FIG. 5A. The charging stand 80A can couple with the eCig 10 (see FIG. 1) as shown in FIG. 5B. The eCig 10 can couple with portions of the charging stand 80A including the groove portions 84. The eCig 10 an also contact the support portion 86.

As described above, the charging stand 80A can include the connectors 44E.sub.1-3 that can facilitate electrical communication between the control electronics 24 and external circuitry, as well as charging of the battery 22 by transmitting a current to the battery 22 from an external power source (e.g., external battery, charger, electronic device, among others). The connectors 44E.sub.1-3 can be located on the support portion 86 as shown in FIG. 4A. In some embodiments (not shown), the eCig 10 can electrically couple with the connectors 44E.sub.1-3 without contacting the support portion 86 where the eCig 10 couples with the groove portions 84 of the charging stand body 82.

The groove portions 84 can be aligned with the wire 92 as shown in FIG. 4B. In other embodiments, the groove portions (and, therefore, the eCig when coupled with the charging stand) can be at different angles with wire 92 (e.g., 30.degree., 45.degree., 60.degree., 90.degree., etc.)

Figure 6:
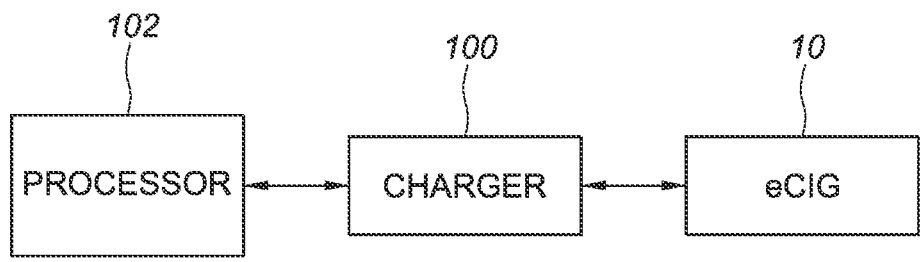
FIG. 6 is a block diagram depicting data exchange pathways between an eCig, a charger, and a processor.

FIG. 6 is a block diagram depicting data exchange pathways between the eCig 10, a charger 100, and a processor 102. The eCig 10 can electrically connect to a charger 100 in order to charge, for example, the battery 22 (see FIG. 1) of the eCig 10. In addition to this charging function, the charger 100 can exchange data with the eCig 10. The data exchange can occur, for example, through a dedicated data line or signals obtained from a power line connecting the charger 100 and the eCig 10 during charging (e.g., the connectors 44A.sub.1-3, 44B.sub.1-3, 44C.sub.1-3; or 44D.sub.1-3; see U.S. application Ser. No. 15/219,195, filed on 25 Jul. 2016, which is hereby incorporated by reference as if set forth fully herein, for additional information on the connectors 44 being used for charging and data exchange). When a data line is used to transfer data between the eCig 10 and the charger 100, the data line can be a physical wire connection (e.g., the connector 90 and the wire 92 in FIGS. 5A-B) or a wireless communication. In an embodiment, the data that can be transferred from the eCig 10 to the charger 100 includes identifying data, such as a serial number, a calibration parameter, a batch code, a line number, or a barcode associated with the eCig 10. In another embodiment, the data that can be transferred from the eCig 10 to the charger 100 includes usage data, such as a number of puffs taken, an average length of puffs taken, a smoke juice level, a smoke juice flavor, or a location of use.

The charger 100 can also exchange data with the processor 102 (e.g., control electronics 24 (FIG. 1) and/or external circuitry), such as through a dedicated data line (e.g., the connectors 44A.sub.1-3, 44B.sub.1-3, 44C.sub.1-3, or 44D.sub.1-3) or power line as described above. In an embodiment, the processor 102 can be a personal computer (PC), a tablet PC, or a mobile device, such as a smart phone. In another embodiment, the processor 102 can be a charging case, holding case or pack or a charging stand for the eCig 10 (e.g., the charging case 40A, the charging cases 60A-C, or the charging stand 80). The processor 102 may have a custom communication driver (e.g., an application) that enables it to exchange data with the charger 100. The data that can be transferred from the charger 100 to the processor 102 includes identifying and usage data from the eCig 10, for example, as described above. In an embodiment, data can also be transferred from the processor 102 to the charger 100, including, for example. data related to various charging protocols. Additional information regarding charging of electronic cigarettes can be found in U.S. application Ser. No. 14/711,593 filed on 13 May 2015, and U.S. application Ser. No. 14/912,141 filed on 15 Feb. 2016, which are hereby incorporated by reference in their entirety for all purposes as if fully set forth herein.

In summary, various embodiments of the present disclosure are directed to an anti-roll system comprising an electronic smoking device, and a charging case comprising at least one anti-roll feature configured to inhibit the electronic smoking device from rolling away from the charging case. The plurality of connectors can also facilitate charging a battery coupled with the electronic smoking device and/or communication between the electronic smoking device and one or more of the charging case and external circuitry. The anti-roll feature comprises a groove configured to hold the electronic smoking device. The groove can be located on an exterior surface of the charging case, a posterior surface of the charging case, or a later surface of the charging case. The plurality of connectors can be located in the groove.

In other embodiments, an anti-roll system can comprise an electronic smoking device, and a charging stand configured to charge or hold the electronic smoking device, wherein the charging stand comprises a plurality of connectors configured to electrically couple with the electronic smoking device, at least one anti-roll feature configured to inhibit the electronic smoking device from rolling away from the charging stand, and a connector, where the connector electrically couples the plurality of connectors with external circuitry. The plurality of connectors can facilitate charging a battery coupled with the electronic smoking device and/or facilitate communication between the electronic smoking device and one or more of the charging stand and external circuitry. The anti-roll feature can comprise a groove portion configured to hold the electronic smoking device, and wherein the groove portion is located on an exterior surface of the charging stand and the plurality of connectors are located in the groove portion. The charging stand can comprises a circular element with two notches aligned with the groove portion. The charging stand can comprise notches proximal an edge of the charging stand. The charging stand can also comprise a support portion, where the plurality of connectors are located on the support portion.

In still other embodiments, a charging case for an electronic smoking device comprises an anti-roll feature, wherein the anti-roll feature is located on an exterior surface of the charging case body and is configured to inhibit the electronic smoking device from rolling away from the charging case, a plurality of connectors configured to electrically couple the electronic smoking device and the charging case when the electronic smoking device is engaged with the anti-roll feature. The plurality of connectors can facilitate charging a battery coupled with the electronic smoking device and/or facilitate communication between the electronic smoking device and one or more of the charging case and external circuitry. The anti-roll feature can comprise a groove configured to hold the electronic smoking device and the plurality of connectors are located in the groove. The groove can be located on an exterior surface of the charging case, a posterior surface of the charging case, or a later surface of the charging case.

Although several embodiments have been described above with a certain degree of particularity, those skilled in the art could make numerous alterations to the disclosed embodiments without departing from the present disclosure. It is intended that all matter contained in the above description or shown in the accompanying drawings shall be interpreted as illustrative only and not limiting. Changes in detail or structure may be made without departing from the present teachings. The foregoing description and following claims are intended to cover all such modifications and variations.

Various embodiments are described herein of various apparatuses, systems, and methods. Numerous specific details are set forth to provide a thorough understanding of the overall structure, function, manufacture, and use of the embodiments as described in the specification and illustrated in the accompanying drawings. It will be understood by those skilled in the art, however, that the embodiments may be practiced without such specific details. In other instances, well-known operations, components, and elements have not been described in detail so as not to obscure the embodiments described in the specification. Those of ordinary skill in the art will understand that the embodiments described and illustrated herein are non-limiting examples, and thus it can be appreciated that the specific structural and functional details disclosed herein may be representative and do not necessarily limit the scope of the embodiments, the scope of which is defined solely by the appended claims.

Reference throughout the specification to "various embodiments," "some embodiments," "one embodiment," "an embodiment," or the like, means that a particular feature, structure, or characteristic described in connection with the embodiment is included in at least one embodiment. Thus, appearances of the phrases "in various embodiments," "in some embodiments," "in one embodiment," "in an embodiment," or the like, in places throughout the specification are not necessarily all referring to the same embodiment. Furthermore, the particular features, structures, or characteristics may be combined in any suitable manner in one or more embodiments. Thus, the particular features, structures, or characteristics illustrated or described in connection with one embodiment may be combined, in whole or in part, with the features structures, or characteristics of one or more other embodiments without limitation.

Any patent, publication, or other disclosure material, in whole or in part, that is said to be incorporated by reference herein is incorporated herein only to the extent that the incorporated materials does not conflict with existing definitions, statements, or other disclosure material set forth in this disclosure. As such, and to the extent necessary, the disclosure as explicitly set forth herein supersedes any conflicting material incorporated herein by reference. Any material, or portion thereof, that is said to be incorporated by reference herein, but which conflicts with existing definitions, statements, or other disclosure material set forth herein will only be incorporated to the extent that no conflict arises between that incorporated material and the existing disclosure material.

LIST OF REFERENCE SIGNS 10 electronic smoking device/electronic cigarette
12 end cap
14 power supply portion
16 atomizer/liquid reservoir portion
18 light-emitting diode (LED)
20 air inlets
22 battery
24 control electronics
26 airflow sensor
28 atomizer
30 heating coil
32 wick
34 central passage
36 liquid reservoir
38 air inhalation port
40 charging case
42 groove
44 electrical connectors or contacts
46 longitudinal axis
48 posterior surface
50 transverse axis
52 charging case body
60 charging case
62 posterior surface
64 right side
66 charging case body
68 charging case lid
70 hinge
80 charging stand
82 charging stand body
84 groove portions
86 support portion
88 edge portion
90 connector
92 wire
100 charger
102 processor

The invention claimed is:

1. An electronic smoking device, comprising:
a power supply portion having a first end and a second end;
an atomizer/liquid reservoir portion attached to the second end of the power supply portion;
the power supply portion including control electronics electrically connected to a battery, an LED, and an airflow sensor, and a plurality of electrical connectors on an outer surface of the power supply portion electrically connected to the control electronics, the electrical connectors on a first side of the power supply portion at the second end of the power supply portion, the electrical connectors adjacent to a mid-point of the electronic smoking device;
the atomizer/liquid reservoir portion including an atomizer having a heating coil wrapped around a wick, and a central passage extending through the atomizer/liquid reservoir portion to an inhalation port, the central passage surrounded by a liquid reservoir of the atomizer/liquid reservoir portion, the wick having ends abutting or extending into the liquid reservoir;
a charging device having external electrical connectors engageable with the electrical connectors on the power supply portion with the power supply portion on a longitudinal axis of the charging device;
the charging device including an open-top groove for vertically receiving the electronic smoking device, the open-top groove extending entirely across the charging device; and
the external electrical connectors within the groove on a top surface of a charging stand, the charging stand has a flat bottom surface, and the atomizer/liquid reservoir portion extends out past a first side of the charging device and the power supply portion extends out past a second side of the charging device, when the external electrical connectors are connected to the electrical connectors on the power supply portion.

2. The electronic smoking device of claim 1 wherein a majority of the length of the power supply portion is on one side of the charging device when the power supply portion is engaged with the charging device.

3. The electronic smoking device of claim 1 wherein the power supply portion further includes a cylindrical housing containing the control electronics, the battery, the LED and the airflow sensor.

4. The electronic smoking device of claim 1 wherein the central passage comprises a hollow tube.

5. The electronic smoking device of claim 1 wherein the electrical connectors are in a single row parallel to a longitudinal axis of the electronic smoking device.

6. The electronic smoking device of claim 1 wherein the battery extends from the first end to a first electrical connector of the plurality of electrical connectors.

7. The electronic smoking device of claim 1 further including a pair of air inlets at an intersection between the power supply portion and the atomizer/liquid reservoir portion, and the airflow sensor is adjacent to the second end of the power supply portion.

8. An electronic cigarette and charger comprising:
a charger having a USB connector and a groove having a pair of opposing side walls and an open top, the groove having a plurality of external charger contacts;
an electronic cigarette having a power supply portion and an atomizer/liquid reservoir portion;
the electronic cigarette having a plurality of charging contacts connecting to the external charger contacts, and the charging contacts centrally located on the electronic cigarette;
the electronic cigarette chargeable by moving it vertical direction, perpendicular to a longitudinal axis of the electronic cigarette, onto the groove on the charger; and
wherein the atomizer/liquid reservoir portion extends out past a first side of the charger and the power supply portion extends out past a second side of the charger, when the external charger contacts are connected to the charging contacts on the power supply portion.

9. An electronic smoking device, comprising:
a power supply portion having a first end and a second end;
an atomizer/liquid reservoir portion attached to the second end of the power supply portion;
the power supply portion including control electronics electrically connected to a battery, an LED, and an airflow sensor, and electrical connectors on an outer surface of the power supply portion electrically connected to the control electronics, the electrical connectors on a first side of the power supply portion at the second end of the power supply portion, the electrical connectors adjacent to a mid-point of the electronic smoking device;
the atomizer/liquid reservoir portion including an atomizer having a heating coil wrapped around a wick, and a central passage extending through the atomizer/liquid reservoir portion to an inhalation port, the central passage surrounded by a liquid reservoir of the atomizer/liquid reservoir portion, the wick having ends abutting or extending into the liquid reservoir;
a charging device having external electrical connectors engageable with the electrical connectors on the power supply portion;
the charging device including an open-top groove for vertically receiving the electronic smoking device, the open-top groove extending entirely across the charging device; and
the external electrical connectors within the groove on a top surface of the charging device, the charging device having a flat bottom surface, the atomizer/liquid reservoir portion extending out past a first side of the charging device and the power supply portion extending out past a second side of the charging device, when the external electrical connectors are connected to the electrical connectors on the power supply portion.

* * * * *